United States Patent
Papadopoulos (12)

(10) Patent No.: US 6,731,751 B1
(45) Date of Patent: May 4, 2004

(54) APPARATUS FOR CORDLESS COMPUTER TELEPHONY

(75) Inventor: Costas Papadopoulos, Acton, MA (US)

(73) Assignee: VXI Corporation, Rollinsford, NH (US)

( * ) Notice: Subject to any disclaimer, the term of this patent is extended or adjusted under 35 U.S.C. 154(b) by 586 days.

(21) Appl. No.: 09/634,073

(22) Filed: Aug. 8, 2000

Related U.S. Application Data
(60) Provisional application No. 60/214,665, filed on Jun. 27, 2000.

(51) Int. Cl.[7] .......................... H04M 11/00; H04M 1/00; H04M 9/00
(52) U.S. Cl. ............................. 379/399.01; 379/93.05; 379/399.02; 379/398; 379/394; 379/413; 379/387.02
(58) Field of Search ....................... 379/399.01, 413.02, 379/413, 398, 394, 413.01, 387, 390.04, 395.01, 402, 403, 404, 387.02, 388.06, 390.01, 391, 399.02, 93.15, 93.05, 387.01

(56) References Cited

U.S. PATENT DOCUMENTS

| | | | | |
|---|---|---|---|---|
| 5,625,673 A | * | 4/1997 | Grewe et al. | 379/428 |
| 5,930,719 A | * | 7/1999 | Babitch et al. | 455/462 |
| 5,960,065 A | * | 9/1999 | Beck et al. | 379/93.07 |
| 5,999,597 A | * | 12/1999 | Brown | 379/93.05 |
| 6,137,879 A | * | 10/2000 | Papadopoulos et al. | 379/387 |
| 6,255,800 B1 | * | 7/2001 | Bork | 320/115 |
| 6,424,647 B1 | * | 7/2002 | Ng et al. | 370/352 |
| 6,643,364 B1 | * | 11/2003 | Takahashi | 379/201.05 |

OTHER PUBLICATIONS

Motorola, Inc. 1995; Motorola Advanc Information Universal Cordless Telephone Subsystem IC; 32–36.

Telecommunication Peripheral Products Technical Practice; DLE–200B Two Way Phone Line Simulator; Mar. 27, 1996; Two Way Phone Line Simulator Ideal For Intersystem Communication and Demos.

SAMS; "Understanding Telephone Electronics" Third Edition by Stephen J. Bigelow; 1983 & 1984 by Texas Instruments, Inc. 1991.

* cited by examiner

*Primary Examiner*—Rexford Barnie
(74) *Attorney, Agent, or Firm*—Gauthier & Connors LLP

(57) ABSTRACT

An interface apparatus interposed between a cordless telephone base unit and a personal computer sound card. Such interface emulates a Central Office connection with respect to the telephone and a mic and speaker connection with respect to the computer sound card. The apparatus is suitable for all cordless telephones regardless of frequency allocation standards because the interface occurs at the RJ-11 modular jack of the cordless phone base, normally intended for connection to a CO line. Differences in telephone line regulations that exist among countries are accounted for with no burden of complexity to the user of the present invention. The interface comprises active and passive circuits perform two-wire-to-four-wire conversion and signal conditioning. Local loop current may be obtained from batteries or a suitable AC power adapter.

8 Claims, 6 Drawing Sheets

APPARATUS FOR CORDLESS COMPUTER TELEPHONY

PRIORITY INFORMATION

This application claims priority from provisional application Ser. No. 60/214,665 filed Jun. 27, 2000.

BACKGROUND OF THE INVENTION

Voice Over Internet Protocol (VoIP) is rapidly gaining acceptance in place of conventional telephony, for long distance calls because generally toll charges can be reduced. Internet telephony providers offer no-cost or low-cost services such that subscribers can originate and receive calls from their computer. The subscriber with appropriate VoIP software installed, wears a headset connected to the sound card of a personal computer. On-screen menus facilitate the dialing process and the computer modem dials out to the telephone exchange of the user's Internet Service Provider. In the interest of minimizing cost to the ISP subscriber, i.e. the calling party, such calls are most often dialed to a local Central Office. The ISP will route the call through the Internet to the Central Office nearest the called party thus avoiding or reducing long distance tolls.

In conventional telephony, cordless sets are replacing corded telephones for reasons of convenience and mobility. The cost of such cordless phones today is low and the frequency spectrum allocation sufficient for the broad consumer market. Newer cordless handsets may come equipped with a headset jack for the added facility of hands-free operation. The headset is sometimes included with the phone or may be sold separately. The headset interface is generally from a 2.5 mm "stereo" plug at the end of the headset cord to a mating jack at the cordless handset. Informally manufacturers have standardized on the following connections for the plug and jack: tip to electret mic, ring to earphone receiver and sleeve to ground.

Just as the Internet is an international medium, little encumbered by national boundaries, so is VoIP becoming popular internationally. For users of VoIP, the reduction of international toll charges is even more significant. Frequency allocation for cordless telephony varies by country or broader region, however. For a manufacturer to offer a product intended for cordless computer telephony, the product must be designed specifically for each set of frequency standards. In the United States for instance, CFR Title 47, Part 15 permits unlicensed operation at 46/49 MHz, 902–928 MHz and 2.4 GHz. China has a 45/48 MHz frequency allocation, France 26/41 MHz, New Zealand 34/40 and so on (see Reference 1, Motorola MC 13109 Universal Cordless Telephone IC). Moreover voltage and frequency standards for AC power vary by region, as do AC plug and socket configurations, placing an additional burden on the design of a cordless telephone.

Certain single purpose wireless headsets for interfacing to a computer are available, but they sell for several times the price of a cordless phone and product selection is limited. The wireless medium used is either diffuse IR or low power RF or magnetic induction. Exemplary units are sold by Andrea Electronics (AWS100 headworn mic using diffuse IR) and Emkay Innovative Products (RF-3296 using RF from mic to base and magnetic induction from base to headphone). They are not mainstream consumer electronic appliances and do not enjoy the cost advantage of high volume cordless phone production.

SUMMARY OF THE INVENTION

In one embodiment of the invention there is provided an interface apparatus interposed between a cordless telephone base unit and a personal computer sound card. Such interface emulates a Central Office connection with respect to the telephone and a mic and speaker connection with respect to the computer sound card. The apparatus is suitable for all cordless telephones regardless of frequency allocation standards because the interface occurs at the RJ-11 modular jack of the cordless phone base, normally intended for connection to a CO line. Differences in telephone line regulations that exist among countries are accounted for with no burden of complexity to the user of the present invention. The interface comprises active and passive circuits perform two-wire-to-four-wire conversion and signal conditioning. Local loop current may be obtained from batteries or a suitable AC power adapter.

In another embodiment of the invention there is provided a "self powered" interface apparatus interposed between a cordless telephone base unit and a personal computer sound card. The interface operates as disclosed above, but without batteries or any concern about AC voltage, frequency or plug variations at the point of use. Instead, loop current is derived from one of the Universal Serial Bus receptacles at the PC. Such USB ports are found on most desktop and notebook computers manufactured since 1997. The USB standard assures that 5 V at 100 mA will be available for a downstream device at the moment of connection. Thus the computer telephony interface apparatus is configured to operate universally with the prevailing cordless telephone standards at the point of use and with no AC power adapter. A further benefit for this embodiment is obtained in connection with a notebook computer: total independence from AC mains when the laptop PC is operating with batteries and the cordless phone base is powered from a spare battery in the charging cradle. An exemplary cordless phone with spare battery provision (in the base unit) and a headset jack (in the handset) is V-Tech model vt1901.

In a third embodiment of the invention, a USB apparatus communicates with and is powered by the USB port to provide cordless headset operation for Internet telephony. Because this USB link to the computer is digital, it obviates the need for mic and speaker connections at the computer; no sound card is required. The USB interface performs the analog to digital and digital to analog conversion instead. The simulated telephone line from the interface apparatus operates with the cordless phone base as described above. With only two cords to connect, USB and RJ-11, this embodiment is simpler for the user.

It will be understood by those of ordinary skill in the art that any consumer telephone set, corded or cordless, with or without a headset jack will operate with the interface to be disclosed in further detail below, just as any telephone, FAX, modem, etc. will operate with any CO line. Such operation is advantageous for persons interested in VoIP but not comfortable with RF devices or headsets and who may prefer a traditional telephone. It will become evident that the invention is additionally suited for other uses: bringing voice to and from the computer for speech recognition, command and control, text to speech and so forth, independent of the modem and the Internet. No interface circuit change is required for such voice enabled applications with any of the embodiments disclosed, only the appropriate software is needed.

All embodiments of the invention are distinctly different from phone line simulators. Such products (see Reference 2, Viking Electronics DLE-200B Two Way Phone Line Simulator) are intended to perform as a rudimentary Central Office for demonstration purposes between two telephone sets. They provide dialtone and ringing voltage (which are not needed here) but do no two-wire-to-four-wire conversion or signal conditioning to carry voice between the user's telephone set and the processor in the PC. Said differently, they do nothing to enable VoIP or speech recognition.

DETAILED DESCRIPTION OF THE ILLUSTRATED EMBODIMENTS

Figure 1:
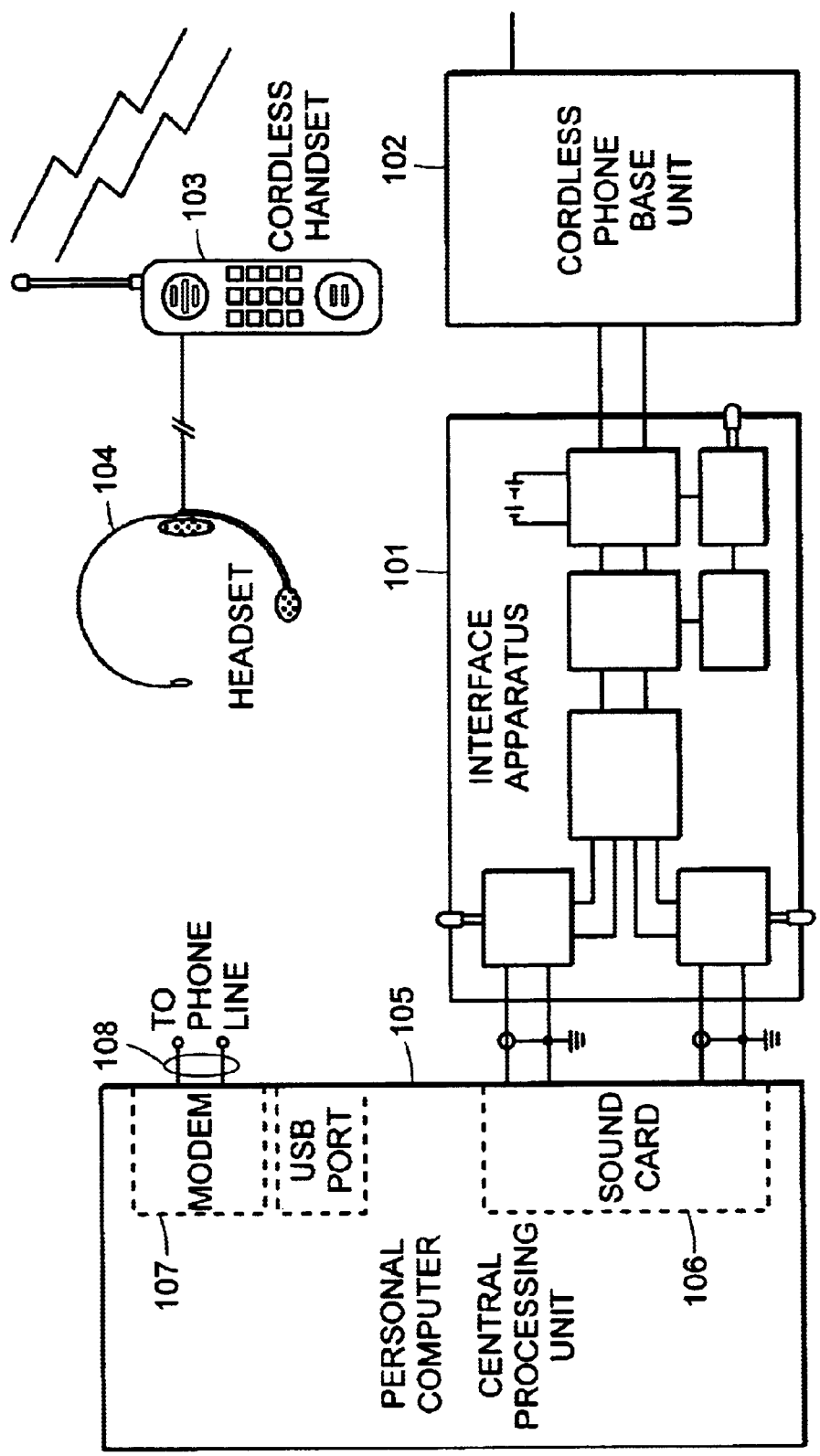
FIG. 1 is a general block diagram of an exemplary interface system in accordance with the invention.

The system depicted in FIG. 1 comprises a cordless telephone set and a personal computer linked by the interface apparatus 101. Cordless phone base unit 102 communicates with its handset 103 via RF. Headset 104 may be optionally connected for hands-free operation and convenience. Personal computer 105 is connected to interface 101 at sound card 106 and to telephone line 108 at modem 107. There is no conventional telephony voice path between phone base 102 and line 108. Instead, analog voice signals to and from the telephone are digitized at sound card 106 and directed by the computer central processing unit to modem 107. The CPU also commands modem 107 to go off-hook, to dial and so forth.

Figure 2:
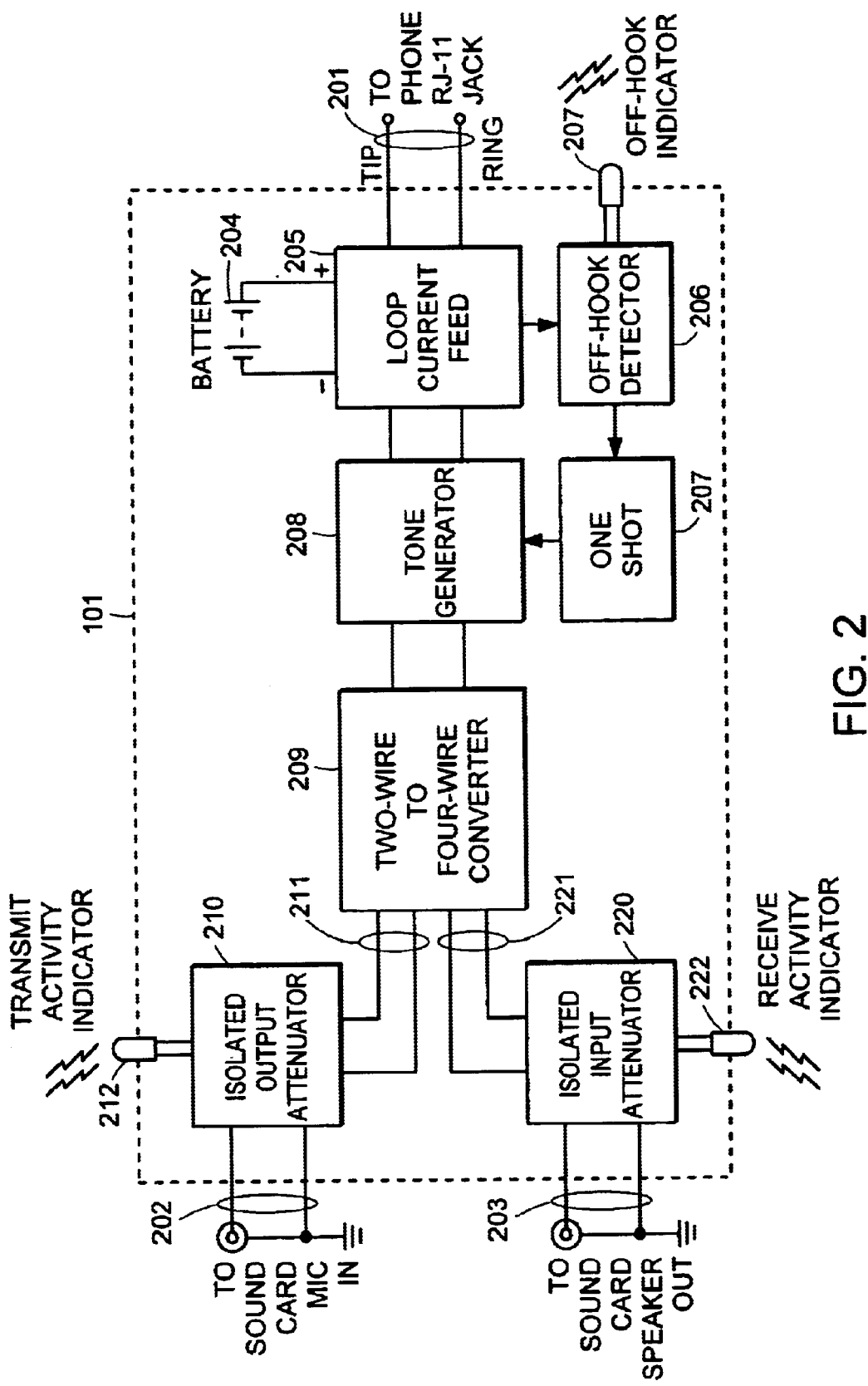
FIG. 2 is a detailed block diagram of the interface apparatus of FIG. 1 of the invention.

Interface 101 is depicted in FIG. 2 as an assembly of seven circuit blocks, a battery and three external connections: to phone jack 201, to sound card mic input 202 and to speaker output 203. The intent of apparatus 101 is to emulate the off-hook condition of a CO line but not provide all the features of a CO subscriber line interface circuit (SLIC). It is only necessary for interface 101 to provide loop current to the phone and to perform two-to-four-wire conversion. Battery 204 and loop current feed 205 present a high impedance to the phone and may be implemented by a 6 V battery in series with a large inductance such as 1 H, across tip and ring. The DC output of an AC power adapter may be used instead of a battery. Inductor winding resistance such as 50 will provide current limiting. When the telephone goes off hook, it causes loop current on the order of 20 mA to flow, which in turn drops tip to ring voltage from 6 V to 5 V. The change trips off-hook detector 206 and turns on LED indicator 207. At the same time detector 206 starts one-shot 207 which then enables tone generator 208 for approximately one second. Thus the user of the invention who is accustomed to hearing dialtone when going off hook, will now hear a "confidence" tone of, say, 700 Hz followed by silence. At this point, VoIP or speech recognition or voice command and control of the PC may begin. It is now clear that RJ-11 connection 201 from interface apparatus 101 is generic and will operate with any type of CO telephone set. That is to say corded and cordless telephones may be connected at the user's choice. One shot 207 and tone generator 208 may be implemented with a dual timer IC, such as NE556.

Two-to-four-wire converter 209 comprises a hybrid (such as two transformers, see Reference 3 page 69) and a resistor-capacitor balancing network as used in a Central office. The hybrid network presents a telephone line impedance such as 600 Ω to the phone. Transmit voice pair 211 is connected to isolated output attenuator 210 where transmit levels of hundreds of millivolts are reduced to tens of millivolts, suitable for sound card mic input 202. Transformer isolation is inherent and desirable for avoiding AC hum; it is provided by hybrid 209. Transmit activity LED 212, driven by a transistor or IC detector across the voice path, flashes with each word spoken. This reassures the user that voice signals are being sent to the computer.

Receive voice pair 221 connects hybrid 209 to sound card output 203 intended for powered loudspeakers and usually termed "line out," via isolated input attenuator 220. Here voice signals of perhaps a volt are reduced to a few hundred millivolts. Here also receive activity LED 222 is driven from a transistor or IC detector stage across the voice path and provides assurance visually. It is desirable to prolong the "on" time of the LED (for instance with a capacitor) by a few seconds. This further reassures the user because the VoIP connection can be unnaturally silent between words or sentences. Impedance levels of approximately 1 kΩ are proper for computer ports 202, 203 and are provided by attenuators 210, 220 respectively.

Figure 3:
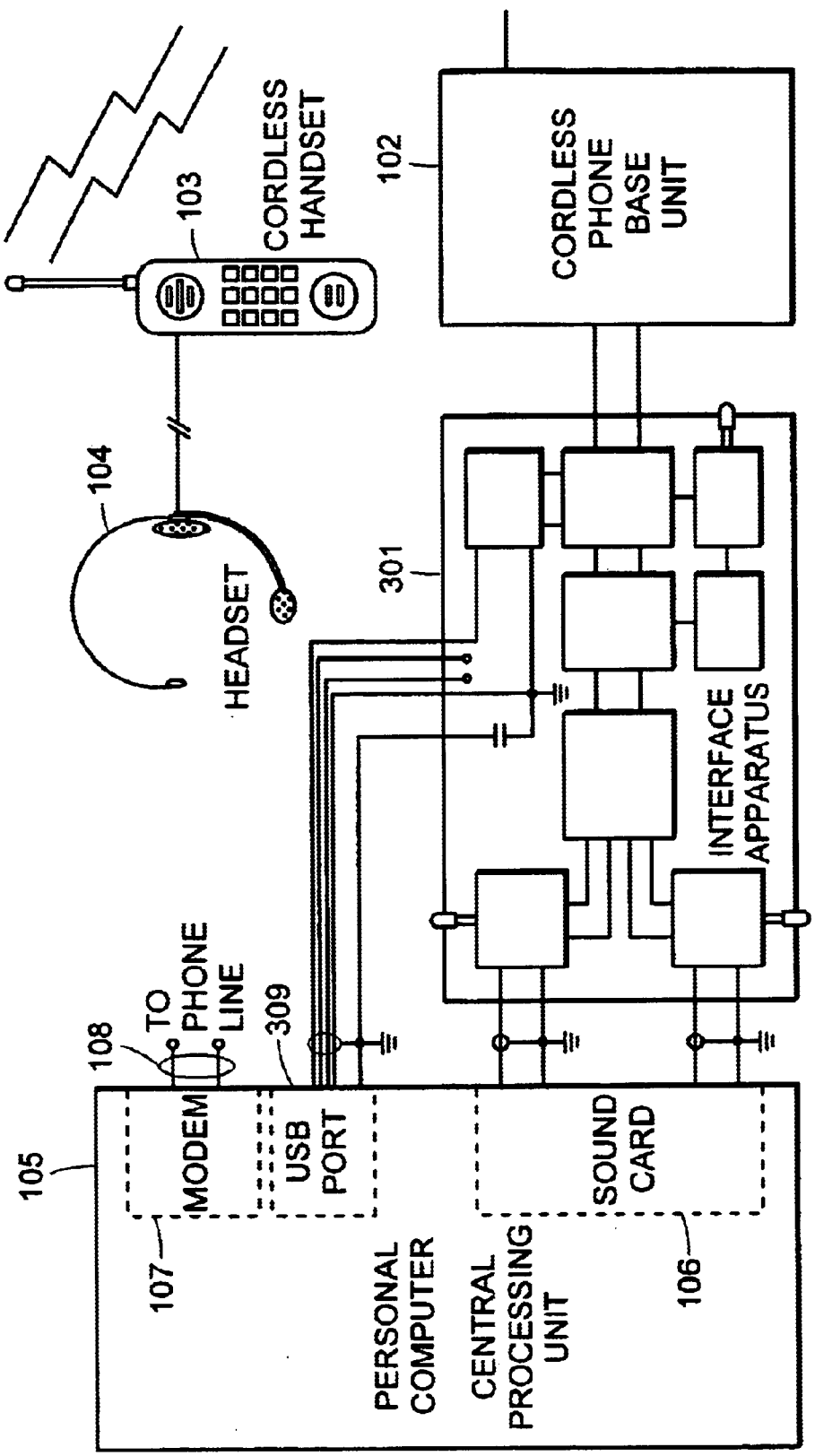
FIG. 3 is a general block diagram of another exemplary embodiment of the invention with USB power and analog interface to the computer.

Another embodiment of the invention is shown in FIG. 3. Here interface apparatus 301 is additionally connected to the computer via USB port 309. The Universal Serial Bus obviates the need for a battery or AC power adapter and will now be described with reference to FIG. 4. USB cable 440 is a shielded four conductor cord with data D+ D− on one pair and 5 V to power downstream devices on the other pair. USB ports will source 5 V at 100 mA when first connected and up to 500 mA after a satisfactory data handshake. Here only the 5 VDC pair is used to provide loop current via filtered "battery" 404. Circuit 404 is a network of small inductors and capacitors to prevent digital noise from corrupting voice signals. All other circuit blocks operate as before with reference to FIGS. 1 and 2.

Figure 5:
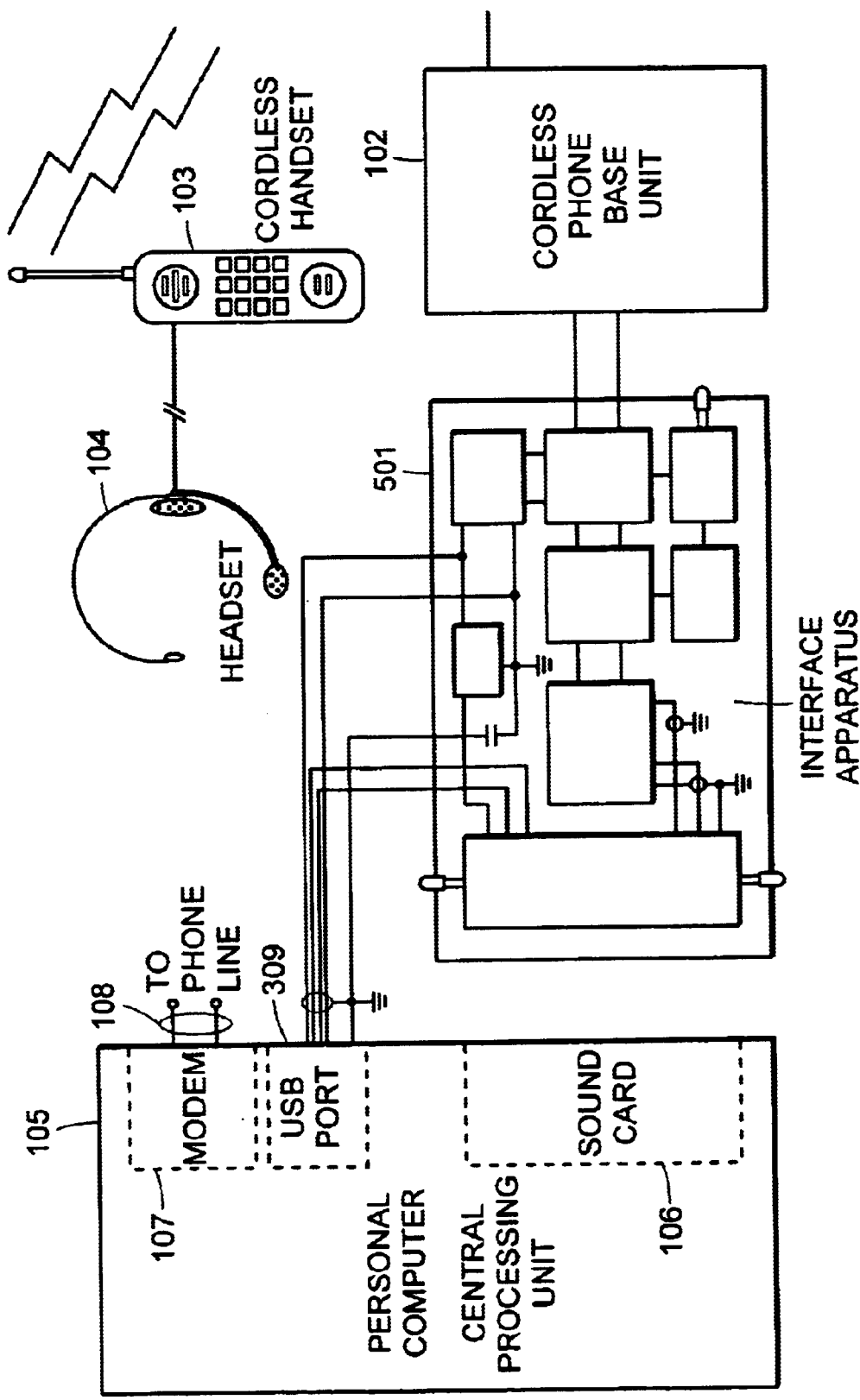
FIG. 5 is a general block diagram of a third exemplary embodiment of the invention with USB power and USB digital interface to the computer.

In a third embodiment of the invention depicted in FIG. 5 interface apparatus 501 connects to the computer USB port for power and data. USB data flow is bi-directional and differential. No sound card and no analog connections are required. Without an internal battery and with only two cords to connect, interface 501 is very compact and convenient. It is also more suitable for new computers such as Apple iBook and IBM NetVista which are "legacy free," that is to say they lack legacy parallel, serial and audio ports in favor of USB.

Figure 4:
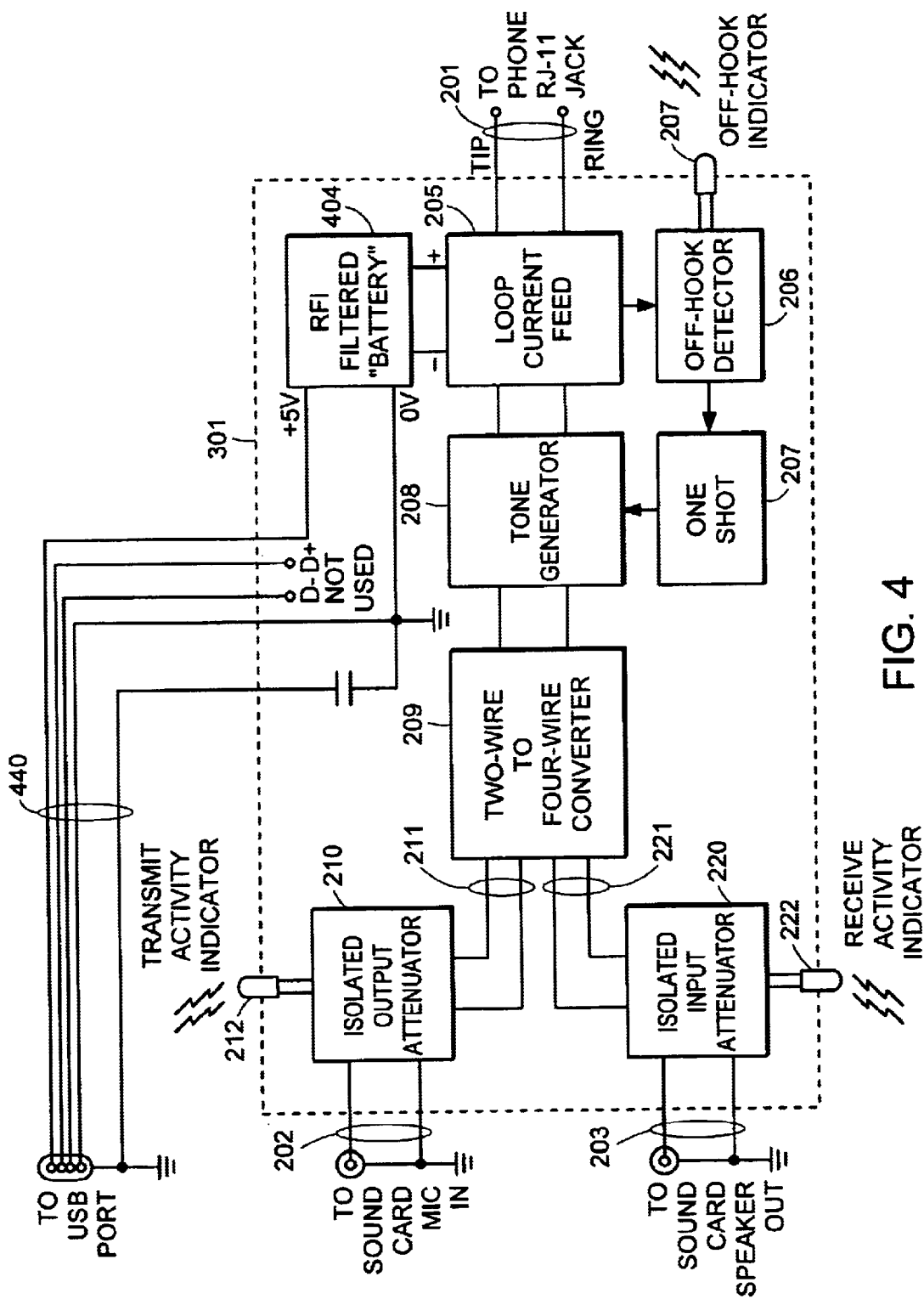
FIG. 4 is a detailed block diagram of the interface apparatus of FIG. 3 of the invention.
Figure 6:
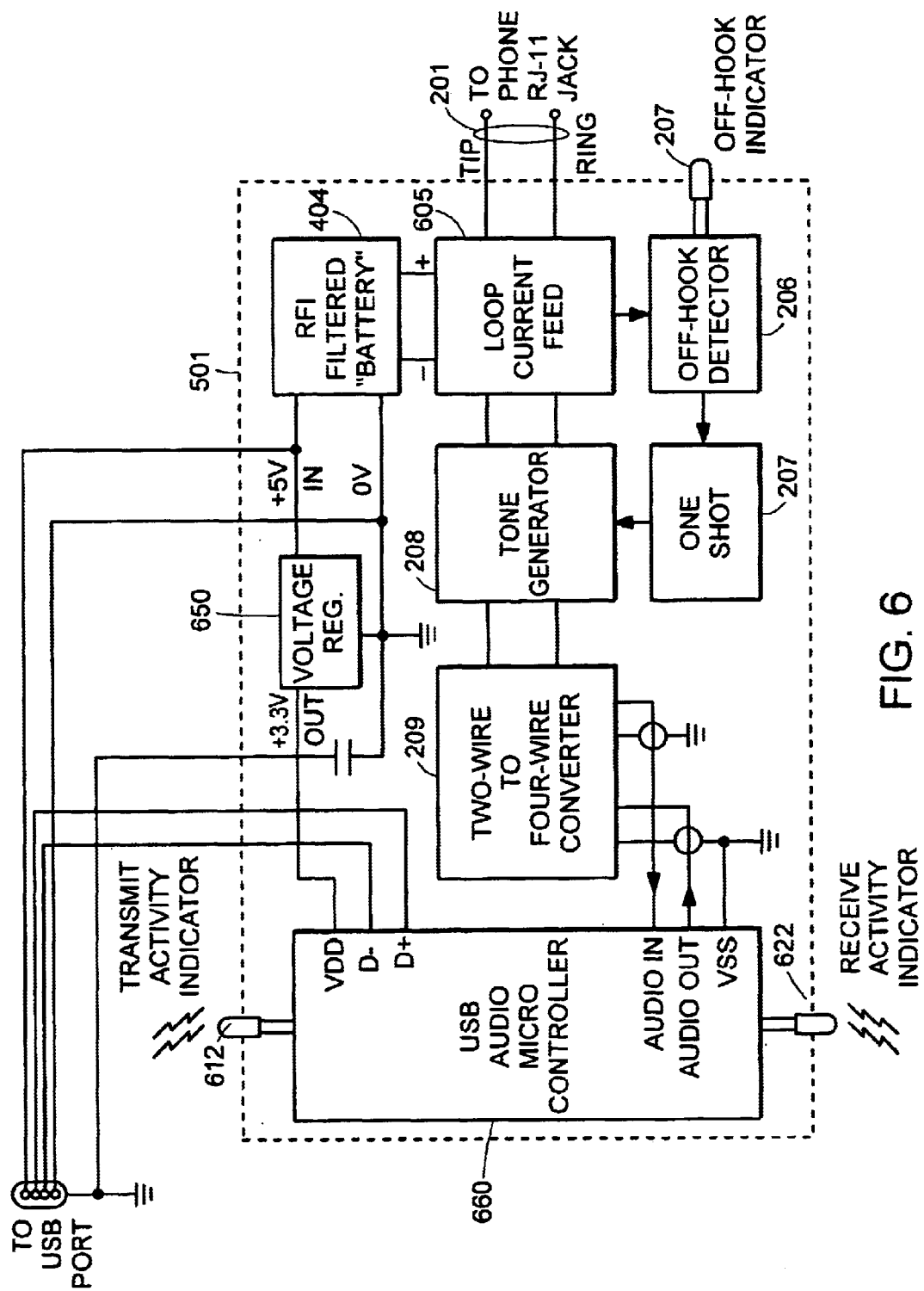
FIG. 6 is a detailed block diagram of the interface apparatus of FIG. 5 of the invention.

Referring now to FIG. 6, voltage regulator 650 and USB audio microcontroller 660 enable this digital link with the computer, while the remaining blocks operate as before with reference to FIGS. 2 and 4. USB circuit 660 may be implemented using one IC such as Philips UDA1325 or with two ICs such as Avance Logic ALU100 USB audio controller and ALC100 audio codec. The microcontroller is directed by the USB audio driver in the computer to set mic and speaker levels, thus no external attenuators are needed. Transmit activity LED 612 and receive LED 622 may also be driven by the micro. If desired, the controller can enable/disable loop current feed 605 to assure USB compliance (very low current drain, under 500 $\mu$A) when the computer is in the sleep mode and the phone goes off hook, although it is unlikely the user will attempt a VoIP call when the PC is asleep.

Implementations equivalent to FIG. 6 may perform off-hook detection and "confidence" tone generation in software. This simplifies hardware but requires additional microcontroller 660 code. It will also be understood by those of ordinary skill in the art that the two-to-four-wire hybrid may be implemented with a resistor bridge. Balance will be excellent since line length is zero and line impedance is determined by resistors in the bridge, typically 600 Ω. Resistive losses in the hybrid are of no concern here since telephony signals are too high for the computer and attenuation is advisable as disclosed.

What is claimed is:

1. A computer telephony system comprising a personal computer having at least one external digital port, a telephone set, and interface apparatus interposed between said computer and said telephone to transmit and receive voice signals, said interface apparatus comprising:

an impedance setting circuit to emulate Central Office connection with respect to said telephone;

a loop current feed circuit to enable operation when said telephone is in off hook condition;

a two to four wire conversion circuit to separate telephone transmit voice signal from receive voice signal;

a codec circuit to perform analog to digital conversion on said transmit signal and digital to analog conversion on said receive signal;

digital interface circuit to enable the exchange of said digitized transmit and receive signals between said codec and said computer external digital port; and a DC power circuit wherein said loop current is obtained from said digital port.

2. The system of claim 1, wherein said telephone set is cordless.

3. The system of claim 2, wherein said telephone provides for headset operation.

4. The system of claim 1, wherein said interface apparatus further comprises a confirmation tone circuit to provide short audible indication when off hook.

5. The system of claim 1, wherein a visual indication is provided when off hook.

6. The system of claim 1, wherein a visual indication is provided of transmit and receive activity.

7. The system of claim 1, wherein said digitized voice signals are serial and bi-directional.

8. The system of claim 1, wherein said computer external port is a Universal Serial Bus port.

* * * * *